United States Patent
Kindler

[11] Patent Number: 5,992,008
[45] Date of Patent: Nov. 30, 1999

[54] DIRECT METHANOL FEED FUEL CELL WITH REDUCED CATALYST LOADING

[75] Inventor: Andrew Kindler, San Marino, Calif.

[73] Assignee: California Institute of Technology, Pasadena, Calif.

[21] Appl. No.: 09/021,694

[22] Filed: Feb. 10, 1998

[51] Int. Cl.[6] .................................................. B23P 19/00
[52] U.S. Cl. .............................. 29/730; 29/746; 429/30; 429/33; 429/42; 427/115; 502/101
[58] Field of Search .................... 429/30, 33, 42, 429/27; 29/730, 746; 427/115; 502/101

[56] References Cited

U.S. PATENT DOCUMENTS

| | | |
|---|---|---|
| 5,336,384 | 8/1994 | Tsou, et al. .............................. 204/252 |
| 5,599,638 | 2/1997 | Surampudi et al. ...................... 429/33 |
| 5,773,162 | 6/1998 | Surampudi et al. ...................... 429/39 |

Primary Examiner—Bruce F. Bell
Attorney, Agent, or Firm—Fish & Richardson P.C.

[57] ABSTRACT

Improvements to direct feed methanol fuel cells include new protocols for component formation. Catalyst-water repellent material is applied in formation of electrodes and sintered before application of ionomer. A membrane used in formation of an electrode assembly is specially pre-treated to improve bonding between catalyst and membrane. The improved electrode and the pre-treated membrane are assembled into a membrane electrode assembly.

26 Claims, 1 Drawing Sheet

5,992,008

DIRECT METHANOL FEED FUEL CELL WITH REDUCED CATALYST LOADING

ORIGIN OF THE INVENTION

The invention described herein was made in the performance of work under a NASA contract, and is subject to the provisions of Public Law 96-517 (35 USC 202) in which the Contractor has elected to retain title.

FIELD

This disclosure relates to direct feed methanol fuel cells and in particular fuel cell electrodes with reduced catalyst loading levels.

BACKGROUND

Fuel cells are electrochemical cells in which a free energy change resulting from a fuel oxidation reaction is converted into electrical energy. Fuel cells may be an alternative to the combustion of nonrenewable fossil fuels. Fuel cells produce by-products including carbon dioxide and water.

Previously some methanol fuel cells used a "reformer" to convert methanol to $H_2$ gas for use by the fuel cells. Direct oxidation fuel cells do not use a reformer and may not require a fuel processing stage. Hence, direct feed fuel cells can offer weight and volume advantages over the indirect reformer fuel cells.

Some prior work in direct feed fuel cells used a strong acid electrolyte which can cause corrosion, degradation of catalyst and other problems that can compromise efficiency. Problems associated with such fuel cells have been well recognized in the art.

Jet Propulsion Laboratory "JPL" developed an improved liquid direct-feed fuel cell using a solid-state electrolyte, preferably a solid polymer cation exchange electrolyte membrane. The JPL fuel cell does not use liquid acidic and alkaline electrolyte and hence obviates many problems in the conventional liquid direct-feed fuel cells. The subject matter of this improvement is described in U.S. Pat. No. 5,599,638, U.S. Pat. No. 5,773,162, and U.S. patent application Ser. No. 08/827,319 (Patent Pending) filed Mar. 26, 1997, the disclosures of which are herewith incorporated by reference to the extent necessary for proper understanding.

Catalyst materials used in such fuel cells are often made from platinum. In order to reduce cost, the minimum amount of catalyst deposit is desirable.

A standard amount of catalyst utilization—loading level, is 4 mg/cm$^2$ However, reducing the loading of catalyst on the anode from 4 mg/cm$^2$ has lead to a significant performance decline of the membrane electrode assemblies ("MEA") in prior art. At low loading levels, e.g. 2 mg/cm$^2$, performance is usually unstable and declines with use. This performance decline is probably due to delamination of the electrode catalyst from the membrane. Hence, a method to improve bonding of the catalyst to the membrane is desired.

At the cathode, the need for high loading appeared to result from coverage of some catalyst by water passing from the anode side through the membrane of the membrane electrode assembly. Water infiltration at the cathode rendered some cathode catalyst inactive because air can not reach the catalyst. Improved water repellency of the membrane is desired.

Methanol crossover includes the undesirable transport of methanol from the anode compartment to the cathode compartment. Methanol crossing the electrode barrier will reduce the efficiency of conversion. Crossover also contributes to the cathode high loading situation described in the previous paragraph.

Another factor that can contribute to high loading at the anode is the migration of catalyst from the anode surface into the catalyst support. This occurs when the electrode and membrane are hot-pressed together to form a membrane electrode assembly "MEA". This catalyst migration may produce negative effects: 1) Catalyst utilization efficiency declines; and 2) The porosity of the catalyst layer increases which can increase methanol crossover. Overall, catalyst migration at the anode can decrease efficiency of the catalyst and result in a general loss in MEA performance. A catalyst solution "ink" that can tolerate high temperatures while keeping the catalyst bound on the anode surface is desired to reduce catalyst migration.

SUMMARY

A general object of this disclosure is to provide a direct feed methanol fuel cell which generates improved performance at reduced catalyst loading levels. Particular methods which address performance problems at low catalyst loading are presented. These methods improve bonding of the catalyst and the membrane at the membrane-electrode interface of the membrane electrode assembly "MEA". Another particular object of the invention is to achieve enhanced water repellency of the membrane to prevent water infiltration into the cathode. Yet another particular object of the invention is to provide a catalyst ink that can tolerate high temperatures while keeping the catalyst bound on the anode surface.

The inventors disclose a process that improves membrane bonding and permits full and stable performance of the fuel cell at anode catalyst loading of 2 mg/cm$^2$. Full performance typically occurs at 400–420 mV @ 300 mA/cm$^2$. This improvement also allows 330 mV @ 300 mA/cm$^2$ performance at loading levels as low as 1 mg/cm$^2$. Pre-treating the membrane with isopropanol before MEA assembly improves catalyst bonding to the membrane.

A method to improve membrane water repellency and a catalyst ink that tolerates high temperatures are presented to address problems of water infiltration at the cathode and catalyst migration at the anode. The catalyst ink is applied in two steps. The first application includes a catalyst-TEFLON (™) mixture. After application of this mixture onto the electrode, the electrode is sintered. NAFION(™) is then applied separately after the electrode cooled.

These further improvements allow the anode to deliver 375 mV @ 300 mA/cm$^2$ at the reduced loading level of 1 mg/cm$^2$. The cathode, at 2 mg/cm$^2$ catalyst loading, can deliver 340 mV/cm$^2$ @ 300 mA/cm$^2$ initially, degrading to 320 mV/cm$^2$ @ 300 mA/cm$^2$ with use. This compares with some prior art models that only achieved a cathode performance of 253 mV/cm$^2$ @ 300 mA/cm$^2$ at 2 mg/cm$^2$ catalyst loading.

BRIEF DESCRIPTION OF THE DRAWINGS

The objects and advantages of the present invention will become more readily apparent after reviewing the following detailed description and accompanying drawings, wherein.

DETAILED DESCRIPTION OF THE INVENTION

Figure 1:
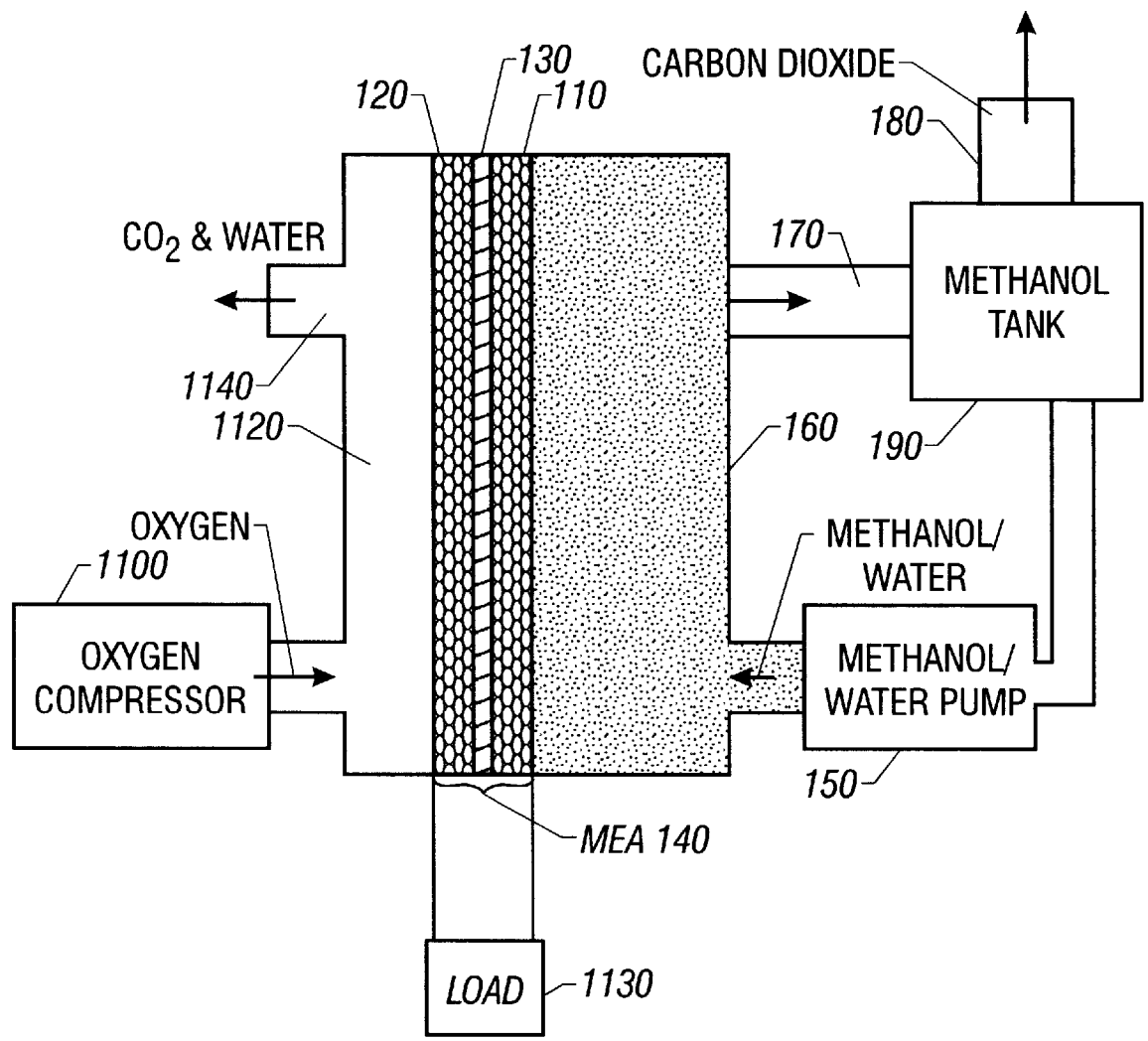
FIG. 1 shows a direct-feed fuel cell.

FIG. 1 illustrates a liquid feed organic fuel cell having anode 110, cathode 120 and solid polymer proton-conducting cation-exchange electrolyte membrane 130. Anode 110, cathode 120 and solid polymer electrolyte membrane 130 are bonded to form a single multi-layer composite structure, referred to herein as membrane-electrode assembly "MEA" 140.

A fuel pump 150 is provided for pumping an organic fuel and water solution into anode chamber 160. The organic fuel and water mixture is withdrawn through outlet port 170 and is recirculated. Carbon dioxide formed in anode chamber 160 is vented through port 180 within tank 190. An air compressor 1100 is provided to feed oxygen or air into a cathode chamber 1120.

Prior to use, anode chamber 160 is filled with the organic fuel and water mixture. Cathode chamber 1120 is filled with air or oxygen either at ambient pressure or in a pressurized state. During operation, the organic fuel in anode chamber 160 is circulated past anode 110. Oxygen or air is pumped into cathode chamber 1120 and circulated past cathode 120. When electrical load 1130 is connected between anode 110 and cathode 120, electro-oxidation of the organic fuel occurs at anode 110 and electro-reduction of oxygen occurs at cathode 120. The occurrence of different reactions at anode 110 and cathode 120 give rise to a voltage difference between those two electrodes.

Electrons generated by electro-oxidation at anode 110 are conducted through external load 1130 and are captured at cathode 120. Hydrogen ions or protons generated at anode 110 are transported directly across membrane electrolyte 130 to cathode 120. A flow of current is sustained by a flow of ions through the cell and electrons through external load 1130.

Anode 110, cathode 120 and membrane 130 form a single composite layered structure, MEA 140. Preferably, membrane 130 is formed from NAFION(™), a perfluorinated proton-exchange membrane material available from DUPONT(™). NAFION(™) is a co-polymer of tetrafluoroethylene and perfluorovinylether sulfonic acid. Other membrane materials can also be used.

Anode 110 is formed from platinum-ruthenium particles either as fine metal powders, i.e. "unsupported", or dispersed on high surface area carbon, i.e. "supported". A bimetallic powder, having separate platinum particles and separate ruthenium particles gives better results than platinum-ruthenium alloy. In a preferred embodiment, the platinum and ruthenium compounds are uniformly mixed and randomly spaced throughout the material, i.e., the material is homogeneous. This homogeneous bimetallic powder is used as the anode catalyst material. The preferred ratio of platinum to ruthenium can be between 60/40 and 40/60. The desired performance level is believed to occur at 60% platinum, 40% ruthenium. Performance degrades slightly as the catalyst becomes 100% platinum. Performance degrades more sharply as the catalyst becomes 100% ruthenium. For platinum-ruthenium, the loading of the alloy particles in the electrocatalyst layer is preferably in the range of 0.5–4.0 mg/cm$^2$. More efficient electro-oxidation is realized at higher loading levels.

Further processing of this anode catalyst by combining with an ionomer and with a water repelling material results in an "ink". The preferred materials include a solution of perflurosulfonic acid, e.g. NAFION(™), and TEFLON(™) micro-particles. TEFLON(™) binds the catalyst onto the electrode. NAFION(™) improves ion conduction resulting in better performance. The catalyst ink is applied to the anode.

This disclosure differs from prior art in that the catalyst ink is separated into two applications. TEFLON(™) and catalyst is applied and sintered. After sintering, the electrode is cooled and NAFION(™) is applied. Detailed description of the process is included herein.

A porous carbon fiber sheet backing is used to make electrical contact with the particles of the electrocatalyst. Commercially available TORAY(™) paper is used as the electrode backing sheet. This paper is first pre-processed to improve water resistant characteristics. This is important to minimize fuel crossover. The pre-processing uses a DUPONT(™) "TEFLON(™) 30" suspension of about 60% solids. This paper needs to be wettable, but not porous. The inventors found a tradeoff between the degree of wettability of the paper and the amount of impregnation into the paper. "TEFLON(™) 30" is added to each 17.1 grams of water. The paper is dipped and then sintered in a furnace oven at 360° C. for one hour. A properly processed paper will have its weight increased by 5% over the course of this process. The paper is weighed to determine if enough absorption has occurred and/or if further paper processing will be necessary. This electrode backing material when coated with a catalyst ink forms a catalyst-coated electrode. Two preferred techniques of application of catalyst are a direct application where the ink is painted on and a sputtering application.

Cathode 120 is a gas diffusion electrode in which platinum particles are bonded to one side of membrane 130. Cathode 120 is preferably formed from unsupported or supported platinum bonded to a side of membrane 130 opposite to anode 110. Unsupported platinum black, e.g. fuel cell grade, available from Johnson Matthey Inc., USA or supported platinum materials available from E-Tek Inc., USA are suitable for the cathode. The cathode metal particles are preferably mounted on an electrode backing material forming a catalyst-coated electrode. The loading of the electrocatalyst particles onto the electrode backing is preferably in the range of 0.5–4.0 mg/cm$^2$. The electrocatalyst alloy and the carbon fiber backing contain 10–50 weight percent TEFLON(™) to provide hydrophobicity needed to create a three-phase boundary and to achieve efficient removal of water produced by electro-reduction of oxygen.

During operation, a fuel and water mixture in the concentration range of 0.5–3.0 mole/liter is circulated past anode 110 within anode chamber 160. Preferably, flow rates in the range of 10–500 ml/min are used. As the fuel and water mixture circulates past anode 110, the following electrochemical reaction, for an exemplary methanol cell, occurs releasing electrons:

$$\text{Anode: } CH_3OH+H_2O \rightarrow CO_2+6H^++6e^- \tag{1}$$

Carbon dioxide produced by the above reaction is withdrawn along with the fuel and water solution through outlet 170 and separated from the solution in a gas-liquid separator. The fuel and water solution is then re-circulated into the cell by pump 150.

Simultaneous with the electrochemical reaction described in equation (1) above, another electrochemical reaction involving the electro-reduction of oxygen, which captures electrons, occurs at cathode 120 and is given by:

$$\text{Cathode: } O_2+4H^++4e^- \rightarrow 2H_2O \tag{2}$$

The individual electrode reactions described by equations (1) and (2) result in an overall reaction for the exemplary methanol fuel cell given by:

$$\text{Cell: } CH_3OH+1.5O_2 \rightarrow CO_2+2H_2O \tag{3}$$

High flow rates are desirable while operating at high current densities to increase the rate of mass transport of organic fuel to the anode as well as to remove the carbon dioxide produced by electrochemical reaction. Low flow rates, however, reduce the crossover of the fuel from the anode to the cathode through the membrane.

Preferably, oxygen or air is circulated past cathode 120 at pressures in the range of 10 to 30 psi. Pressures greater than ambient improve the mass transport of oxygen to the sites of electrochemical reactions, especially at high current densities. Water produced by electrochemical reaction at the cathode is transported out of cathode chamber 1120 by flow of oxygen through port 1140.

In addition to undergoing electro-oxidation at anode 110, the liquid fuel which is dissolved in water permeates through solid polymer electrolyte membrane 130 and combines with oxygen on the surface of the cathode electrocatalyst. This process is described by equation (3) for the example of methanol. This phenomenon is termed "fuel crossover". Fuel crossover lowers the operating potential of the oxygen electrode and results in consumption of fuel without producing useful electrical energy. In general, fuel crossover is a parasitic reaction which lowers efficiency, reduces performance and generates heat in the fuel cell. Reduction of fuel crossover is desired. The rate of crossover is proportional to the permeability of the fuel through the solid electrolyte membrane and increases with increasing concentration and temperature.

Protons generated at anode 110 and water produced at cathode 120 are transported between the two electrodes by proton-conducting solid electrolyte membrane 130. The maintenance of high proton conductivity of membrane 130 is important to the effective operation of an organic/air fuel cell. The water content of the membrane is maintained by providing contact directly with the liquid fuel and water mixture. The thickness of the proton-conducting solid polymer electrolyte membranes should preferably be in the range from 0.05–0.5 mm. Membranes thinner than 0.05 mm may result in membrane electrode assemblies which are poor in mechanical strength. Membranes thicker than 0.5 mm may suffer extreme and damaging dimensional changes induced by swelling of the polymer by the liquid fuel and water solutions. Thick membranes may also exhibit excessive resistance. The ionic conductivity of the membranes is preferably greater than 1 ohm$^{-1}$ cm$^{-1}$.

Anode 110, membrane 130, and cathode 120 are assembled into membrane electrode assembly 140. Preferably, the electrode and the membranes are first laid or stacked on a CP-grade 5 Mil, 12-inch by 12-inch titanium foil. Titanium foil is used to prevent acid from the membrane from leaching into the electrode.

First, the anode electrode is laid on the foil. The proton conducting membrane is stored wet to maintain the desired membrane properties. The proton conducting membrane is first mopped dry to remove the macro-sized particles. The membrane is then placed directly on the anode. The cathode is placed on top of the membrane. Another titanium foil is placed over the cathode.

The edges of the two titanium foils are clipped together to hold the layers of materials in position. The titanium foil and the membrane between which the assembly is to be pressed includes two stainless steel plates which are each approximately 0.25 inches thick.

The membrane and the electrode in the clipped titanium foil assembly is carefully placed between the two stainless steel plates. The two plates are held between jaws of a press, e.g. arbor press. The press is preferably maintained at room temperature.

The press is then actuated to develop a pressure between 1000 and 1500 psi, with 1250 psi being a desired pressure. The pressure is held for 10 minutes. After 10 minutes of pressure, heating is commenced. The heat is slowly ramped up to about 146° C.; although anywhere in the range of 140–150° C. has been found to be effective. The slow ramping up should take place over 25–30 minutes, with the last 5 minutes of heating being a time of temperature stabilization. The temperature is allowed to stay at 146° C. for approximately 1 minute. At that time, the heat is switched off, but the pressure is maintained.

The press is then rapidly cooled using circulating water, while the pressure is maintained at 1250 psi. When the temperature reaches 45° C., approximately 15 minutes later, the pressure is released. The bonded membrane and electrodes are then removed and stored in de-ionized water.

Further Improvements:

Membrane Pre-treatment

The membrane is pre-treated in isopropanol, preferably a 5.3 M isopropanol solution, to soften and swell the membrane before hot pressing. Softening the membrane allows better interpenetration of the catalyst and membrane. Swelling the membrane before bonding results in shrinkage during actual use of the assembly in methanol. This shrinkage provides a "lock and key" bonding between the catalyst and membrane. Membrane pre-treatment reduces delamination of the electrode catalyst from the membrane and increase performance of the fuel cell at low catalyst loading.

Improved Catalyst Ink

The catalyst "ink" has three major components: 1)catalyst, 2)polytetrafluoroethylene "PTFE", e.g. TEFLON (™), suspension, and 3) NAFION(™) solution. To prevent catalyst migration during hot pressing, TEFLON(™) can be sintered at temperatures above 300° C., preferably at 350° C. Such high temperatures soften TEELON(™) sufficiently to greatly improve TEFLON(™)'s bonding to the electrode. As a result, TEFLON(™) will also better hold the catalyst in place, thereby preventing catalyst migration during subsequent hot pressing.

However, NAFION(™), the third component of the catalyst ink cannot tolerate high temperatures. NAFION(™) is an ionomer that allows ionic conduction within the electrode. When NAFION(™) is applied to the electrode, performance is enhanced. Hence, use of NAFION(™) is preferred for the overall efficient performance of the MEA.

To prevent destroying the NAFION(™), NAFION(™) is removed from the ink. The ink is applied onto an electrode backing material forming a catalyst-coated electrode. This catalyst-coated electrode is then sintered to take advantage of TEFLON(™)'s improved binding and hydrophobicity when exposed to high temperatures. The NAFION(™) is then separately applied after the electrode has cooled, this preserves NAFION(™)'s ability to enhance MEA performance.

In a preferred implementation, the ink includes dilute "TEFLON(™) 30" suspension of 12 weight percent solids having 1 gram of "TEFLON(™) 30" concentrate to 4 grams of de-ionized water. 300 mg of de-ionized water is added to 350 mg of the 12 weight percent TEFLON(™) solution. 144 mg of platinum-ruthenium is mixed into this solution. The resultant mixture is then mixed using an ultrasonic mixing technique—known in the art as "sonicate". This mixture is "sonicated" for about 4 minutes.

Since NAFION(™) is removed from the ink, water mixed with trition detergent is added to improve dispersion of the catalyst within the reformulated ink. The ink is then applied onto an electrode backing material forming a catalyst-coated electrode. The preferred material amount described above is applied onto one side of a 2-inch by 2-inch piece of 5 weight percent teflonized carbon paper. Accordingly, the application process is continued is until all the catalyst is used. This catalyst-coated electrode is then fired at about 350° C. under nitrogen gas.

After a cooling period, NAFION(™) is applied separately onto the catalyst-coated electrode at room temperature. Approximately 1 mg of NAFION(™) is added per square centimeter of electrode. The electrode is dried for approximately 30 minutes. After 30 minutes, the electrode is hot press bonded with a pre-treated membrane to form a MEA.

Sintering the catalyst-TEFLON(™) mixture separate from the application of the NAFION(™) reduces catalyst migration and preserves NAFION(™)'s ability to enhance MEA performance.

This same procedure also achieves the object of preventing water infiltration at the cathode. Water repellency at the cathode permits better access of air which leads to better utilization of the platinum catalyst. TEFLON(™), when sintered at temperatures above 300° C., can provide better water repellency. TEFLON(™)'s water repellent quality for a material is directly related to TEFLON(™)'s binding ability to that material. Improving TEFLON(™)'s binding to the electrode can result in the electrode taking on TEFLON(™)'s water repellent qualities more completely. Thus, sintering the catalyst-TEFLON(™) coating enhances electrode's hydrophobicity. This same process also produces a more coherent and dense catalyst layer. This has the added advantage of preventing flooding of the MEA.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. A method of forming a fuel cell, comprising:
   obtaining catalyst material of a type that catalyzes an electrochemical reaction;
   mixing said catalyst material with a material that has a tendency to repel water to form a catalyst ink;
   applying said catalyst ink to an electrode backing material to form a catalyst-coated electrode;
   sintering said catalyst-coated electrode;
   cooling said catalyst-coated electrode after said sintering;
   applying an ionomer to said catalyst-coated electrode after said cooling, to form an electrochemical anode element or a electrochemical cathode element;
   pre-treating a solid electrolyte membrane in order to soften and swell said membrane; and
   hot press bonding said solid electrolyte membrane, which has been softened and swelled, between said anode element and said cathode element to form a membrane electrode assembly.

2. A method as recited in claim 1, wherein said catalyst material is of a type that catalyzes anode reactions when forming said anode element.

3. A method as recited in claim 2, wherein said catalyst material is a platinum-ruthenium catalyst.

4. A method as recited in claim 1, wherein said catalyst material is of a type that catalyzes cathode reactions when forming said cathode element.

5. A method as recited in claim 4, wherein said catalyst material is a platinum catalyst.

6. A method as recited in claim 1, wherein said water-repelling material is polytetrafluoroethylene (PTFE).

7. A method as recited in claim 1, wherein said catalyst ink consists of an agent which ensures proper dispersion of said catalyst material within said catalyst ink.

8. A method as recited in claim 7, wherein said agent is a solution of water mixed with triton detergent.

9. A method as recited in claim 1, wherein said electrode backing material is a porous carbon fiber backing sheet.

10. A method as recited in claim 1, wherein said sintering occurs at temperatures above 300 degrees Celsius.

11. A method as recited in claim 1, wherein said sintering occurs under nitrogen gas.

12. A method as recited in claim 1, wherein said cooling is applied until said catalyst-coated electrode is cooled to room temperature, approximately 25 degrees Celsius.

13. A method as recited in claim 1, wherein said ionomer is liquid co-polymer of tetrafluroethylene and perfluorovinylether sulfonic acid.

14. A method as recited in claim 1, wherein said solid electrolyte membrane is a perfluorinated proton-exchange membrane.

15. A method as recited in claim 1, wherein said pre-treating is achieved with a softening and swelling agent.

16. A method as recited in claim 15, wherein said softening and swelling agent is an isopropanol solution.

17. A method as recited in claim 16, wherein said isopropanol solution has a concentration of 5.3 moles/liter.

18. A method of forming an electrode for a fuel cell, comprising:
   obtaining catalyst material of a type that catalyzes an electrochemical reaction;
   mixing said catalyst material with a material that has a tendency to repel water to form a catalyst ink;
   applying said catalyst ink to an electrode backing material to form a catalyst-coated electrode;
   sintering said catalyst-coated electrode;
   cooling said catalyst-coated electrode after said sintering;
   obtaining an ionomer;
   applying said ionomer to said catalyst-coated electrode after said cooling.

19. A method as recited in claim 18, wherein said water-repelling material is polytetrafluoroethylene (PTFE).

20. A method as recited in claim 18, wherein said catalyst ink consists of an agent which ensures proper dispersion of said catalyst material within said catalyst ink.

21. A method as recited in claim 20, wherein said agent is a solution of water mixed with triton detergent.

22. A method as recited in claim 18, wherein said electrode backing material is a porous carbon fiber backing sheet.

23. A method as recited in claim 18, wherein said sintering occurs at temperatures above 300 degrees Celsius.

24. A method as recited in claim 18, wherein said sintering occurs under nitrogen gas.

25. A method as recited in claim 18, wherein said cooling is applied until said catalyst-coated electrode is cooled to room temperature, approximately 25 degrees Celsius.

26. A method as recited in claim 18, wherein said ionomer is liquid co-polymer of tetrafluroethylene and perfluorovinylether sulfonic acid.

* * * * *